United States Patent Office 3,439,024
Patented Apr. 15, 1969

3,439,024
PREPARATION OF LINALYL ESTERS
John Edward Milks and Roland Pierre Scharrer, Stamford, Conn., assignors to Arizona Chemical Company, New York, N.Y., a corporation of Delaware
No Drawing. Filed Nov. 22, 1965, Ser. No. 509,161
Int. Cl. C07c 69/02, 33/02, 67/00
U.S. Cl. 260—489                                   6 Claims

ABSTRACT OF THE DISCLOSURE

A process is provided for the preparation of tertiary terpene allylic esters in which a terpene allylic halide is subjected to an esterification reaction with a carboxylic acid salt, under non-aqueous conditions at temperatures between about 20° C. and about 100° C. in the presence of either 1,3-diphenylguanidine or its acid addition salts, and recovering a tertiary terpenic allylic ester composition in good yield.

---

This invention relates to the esterification of terpenic allylic halides. More specifically, it relates to the esterification of terpenic allylic halides utilizing carboxylic acid salts in the presence of catalytic amounts of 1,3-diphenylguanidine to prepare at least about 50%, or more, of tertiary allylic esters.

As is known, attempts have been made to convert terpenic allylic halides to their corresponding esters. For instance, in United States Letters Patent No. 3,031,442, there is disclosed a process for the conversion of myrcene hydrohalides to terpenic allylic esters comprising principally geranyl and neryl esters, useful in preparing valuable products for perfume formulations. It is there stated that the esterification process which results in the formation of primary esters in major amounts and tertiary esters in minor amounts (less than 50%) can be achieved only with difficulty. This is due to the nature of the reactants, terpenic allylic halides, which are relatively unstable, tending to thermally dehydrohalogenate as well as cyclize to terpinyl halides under the known vigorous esterification conditions. To overcome the aforementioned difficulties, patentee employs a nitrogen base catalyst introduced prior to esterification of myrcene hydrohalides, whereby the primary geranyl and neryl esters are principally formed. Unfortunately, a major amount of 50%, or more, of tertiary esters, i.e., linalyl esters, cannot be obtained, when desired, utilizing any nitrogen base catalyst.

It is, therefore, a principal object of the invention to provide an improved process for reacting terpenic allylic halides with salts of carboxylic acids to prepare terpenic allylic esters principally of the tertiary type. It is a further object of the invention to provide an improved process for manufacturing terpenic allylic esters comprising a major amount of the tertiary ester type, such as the linalyl ester, utilizing a specific nitrogen base catalyst.

To this end, it has been unexpectedly found that a specific nitrogen base catalyst, namely, 1,3-diphenylguanidine and acid addition salts thereof, can be employed as a catalyst to produce terpenic allylic esters of the tertiary type in good yield. Absent such catalyst addition, little or no reaction is noted.

According to the process of the invention, a terpenic allylic halide which may or may not contain any suspended cuprous halide employed in its manufacture is reacted with at least a molar equivalent of a salt of a carboxylic acid in the presence of a catalytic quantity of 1,3-diphenylguanidine at temperatures ranging from at least about 20° C. to about 100° C., and usually employing a temperature slightly below 100° C. Resultant composition comprises a major amount of tertiary ester, usually more than about 50% and a minor amount of primary ester.

The terpenic allylic halide can be prepared by well known methods. One such method involves the addition of a hydrogen halide, such as hydrogen chloride, to a terpene containing a conjugated system of double bonds, such as myrcene in the presence or absence of cuprous halide, as a catalyst. Illustrative allylic halides are: myrcene hydrochloride, myrcene dihydrochloride, myrcene bromide, myrcene dihydrobromide which contain from 0% to 1.5%, or more, cuprous halide.

Advantageously, carboxylic acid salts which may be employed herein can be widely varied. They include the alkali metal salts or alkaline earth metal salts of: (a) a monoaliphatic carboxylic acid, (b) a monoaromatic acid, (c) an aliphatic dicarboxylic acid, or (d) an aromatic dicarboxylic acid. Specific acid salts contemplated are: potassium phthalate, sodium phthalate, sodium acetate, calcium acetate, potassium butyrate, sodium succinate, barium succinate, sodium benzoate and potassium benzoate. In general, the use of any particular acid salt is not critical, insofar as the over-all process is concerned.

Illustrative of the contemplated esterification catalyst may be mentioned: 1,3-diphenylguanidine as well as its acid addition salt, such as 1,3-diphenylguanidine acetate, 1,3-diphenylguanidine hydrochloride, 1,3-diphenylguanidine sulfate, 1,3-diphenylguanidine phosphate, 1,3-diphenylguanidine benzoate and equivalents thereof.

For optimum esterification efficiency, the amount of the diphenylguanidine catalyst used will range from about 0.5% to about 10%, or higher, based on the weight of the terpenic halide reactant. The reaction is preferably carried out for from six to eight hours in a non-aqueous, substantially moisture-free environment, due to the relatively unstable condition of the resultant terpenic allylic ester composition in water.

The following examples will serve to illustrate the invention further, whereby linalyl esters in excess of about 50% are principally recovered and the formation of primary esters comprising geranyl and neryl esters is retarded.

EXAMPLE 1

In a suitable vessel are added 179 grams of β-pinene pyrolysate, containing one mole (136 grams) of myrcene, and 0.9 gram of cuprous chloride. To the latter mixture are added 49 grams of hydrogen chloride gas at 10° C.–20° C. The mixture is filtered to remove residual cuprous chloride. Resulting filtrate is then treated with 120 grams of sodium acetate and 10.56 grams of 1,3-diphenylguanidine. After heating the mixture at 90° C.–95° C. with agitation for 8 hours, a liquid product is recovered and washed with water.

The washed product is analyzed by vapor phase chromatography to determine is composition. The percent composition of the esters is: 51% linalyl acetate, 21% neryl acetate and 28% geranyl acetate.

Substantially the same ester composition as analyzed above is obtained where 1.3-diphenylguanidine hydrochloride is employed in lieu of 1,3-diphenylguanidine.

EXAMPLE 2

Repeating Example 1 in every detail except that 1,3-diphenylguanidine is omitted, no ester formation in the product recovered is found.

EXAMPLE 3

The procedure of Example 1 is carried out in every detail except that an equivalent amount of triethylamine was added in lieu of 1,3-diphenylguanidine. Under vapor phase chromatography, the composition of the resultant esters analyzed is found to comprise: 55% geranyl acetate, 41% neryl acetate and 4% linalyl acetate.

EXAMPLE 4

Repeating Example 1 in every detail except that residual cuprous chloride is not filtered prior to esterification. The composition of the resultant esters is found to comprise: 64% linalyl acetate, 15% neryl acetate and 21% geranyl acetate.

EXAMPLE 5

The procedure of Example 1 is again repeated, except that calcium acetate is substituted for sodium acetate. A composition comprising substantially the same esters as found in Example 1 is obtained in good yield.

We claim:
1. An improved process for preparing tertiary terpene allylic esters which comprises: subjecting a terpenic allylic halide to esterification with a carboxylic acid salt under non-aqueous conditions at temperatures between about 20° C. and 100° C. in the presence of a catalyst selected from the class consisting of 1,3-diphenylguanidine and an acid addition salt thereof, and recovering an ester composition comprising a major amount of at least 50% of a tertiary terpenic allylic ester.
2. The process according to claim 1 wherein the terpenic allylic halide is myrcene hydrohalide.
3. A process according to claim 1 wherein the terpenic allylic halide is myrcene hydrochloride.
4. A process according to claim 1 wherein the catalyst is 1,3-diphenylguanidine.
5. A process according to claim 1 wherein the catalyst is 1,3-diphenylguanidine acetate.
6. A process according to claim 1 wherein the catalyst is 1,3-diphenylguanidine hydrochloride.

References Cited

UNITED STATES PATENTS 3,031,442    4/1962    Webb _____ 260—489

FOREIGN PATENTS 1,290,402    3/1962    France.
1,190,932    4/1965    Germany.

LORRAINE A. WEINBERGER, Primary Examiner.

V. GARNER, Assistant Examiner.

U.S. Cl. X.R.
260—475, 476, 485